United States Patent
Johnston et al.

(10) Patent No.: US 9,656,301 B2
(45) Date of Patent: May 23, 2017

(54) SORTING SYSTEM FOR DAMAGED PRODUCT

(71) Applicant: BRATNEY COMPANIES, Des Moines, IA (US)

(72) Inventors: Thomas R. Johnston, Altoona, IA (US); Curt Mathew Davis, Ankeny, IA (US)

(73) Assignee: K. B. C. Group, Inc., Urbandale, IA (US)

( * ) Notice: Subject to any disclaimer, the term of this patent is extended or adjusted under 35 U.S.C. 154(b) by 0 days.

(21) Appl. No.: 14/512,864

(22) Filed: Oct. 13, 2014

(65) Prior Publication Data
US 2015/0027934 A1    Jan. 29, 2015

Related U.S. Application Data

(63) Continuation of application No. 13/681,649, filed on Nov. 20, 2012, now Pat. No. 8,930,015.

(51) Int. Cl.
| | |
|---|---|
| *G06F 7/00* | (2006.01) |
| *B07C 5/342* | (2006.01) |
| *B07C 5/36* | (2006.01) |
| *B65G 37/00* | (2006.01) |
| *B65G 47/46* | (2006.01) |

(52) U.S. Cl.
CPC ............. *B07C 5/3422* (2013.01); *B07C 5/36* (2013.01); *B65G 37/00* (2013.01); *B65G 47/46* (2013.01)

(58) Field of Classification Search
None
See application file for complete search history.

(56) References Cited

U.S. PATENT DOCUMENTS

| | | | |
|---|---|---|---|
| 4,186,836 A | 2/1980 | Wassmer et al. | |
| 4,487,321 A * | 12/1984 | Bliss | A01K 43/00 209/510 |
| 4,805,778 A * | 2/1989 | Nambu | A01K 43/00 209/3.3 |
| 4,991,719 A | 2/1991 | Butcher et al. | |
| 5,969,339 A * | 10/1999 | McMurray | G05B 19/4182 250/206.1 |
| 7,222,738 B1 | 5/2007 | Stockard | |
| 7,674,994 B1 * | 3/2010 | Valerio | B07C 5/344 209/556 |
| 2002/0134710 A1 * | 9/2002 | Nagler | B07C 5/38 209/509 |
| 2003/0029139 A1 * | 2/2003 | Ng | A47L 15/0076 53/426 |
| 2004/0164004 A1 * | 8/2004 | Sherrell | B07C 5/36 209/576 |
| 2006/0038978 A1 * | 2/2006 | Zweig | G01N 33/085 356/56 |
| 2009/0250384 A1 | 10/2009 | Valerio | |
| 2013/0008475 A1 * | 1/2013 | Robinson | G01N 33/08 134/115 R |

* cited by examiner

*Primary Examiner* — Yolanda Cumbess
(74) *Attorney, Agent, or Firm* — Brick Gentry PC; Brian J. Laurenzo; Jessica L. Susie

(57) ABSTRACT

A sorting system having a plurality of sorting assemblies where each sorting assembly has an image device that transmits an image of product to a controller that then actuates a robotic sorting device to remove damaged product through a suction tube based upon the transmitted image.

8 Claims, 2 Drawing Sheets

US 9,656,301 B2

SORTING SYSTEM FOR DAMAGED PRODUCT

CROSS REFERENCE TO A RELATED APPLICATION

This application is a continuation of U.S. patent application Ser. No. 13/681,649 filed Nov. 20, 2012.

BACKGROUND OF THE INVENTION

This invention is directed toward a sorting system for damaged products, and more particularly to a sorting system that utilizes an image device and robotic sorting device to separate damaged product from non-damaged product.

Sorting systems are well known in the art. For some products, particularly those that require visual inspection, the systems require manual removal and are labor intensive. These systems also, in addition to being expensive to operate, are not as accurate as desired at an acceptable speed or require longer periods of sorting to increase accuracy. Accordingly, there is a need in the art for a system that addresses these needs.

Therefore, an objective of the invention is to provide a sorting system that is automatic with a high level of accuracy.

Another objective of the invention is to provide a sorting system that is less expensive and more efficient to operate.

These and other objectives will be apparent to one skilled in the art based upon the following written description, drawings, and claims.

SUMMARY OF THE INVENTION

A sorting system having a plurality of sorting assemblies with each sorting assembly having a conveyor mounted to a frame, a light source and image device mounted to the frame above the conveyor, a sorting device moveably mounted to the frame downstream of the image device, wherein the sorting device removes damaged product utilizing a suction tube based on an image of the product sent to a controller that operates robotic arms of the sorting device.

DETAILED DESCRIPTION OF THE PREFERRED EMBODIMENTS

Figure 1:
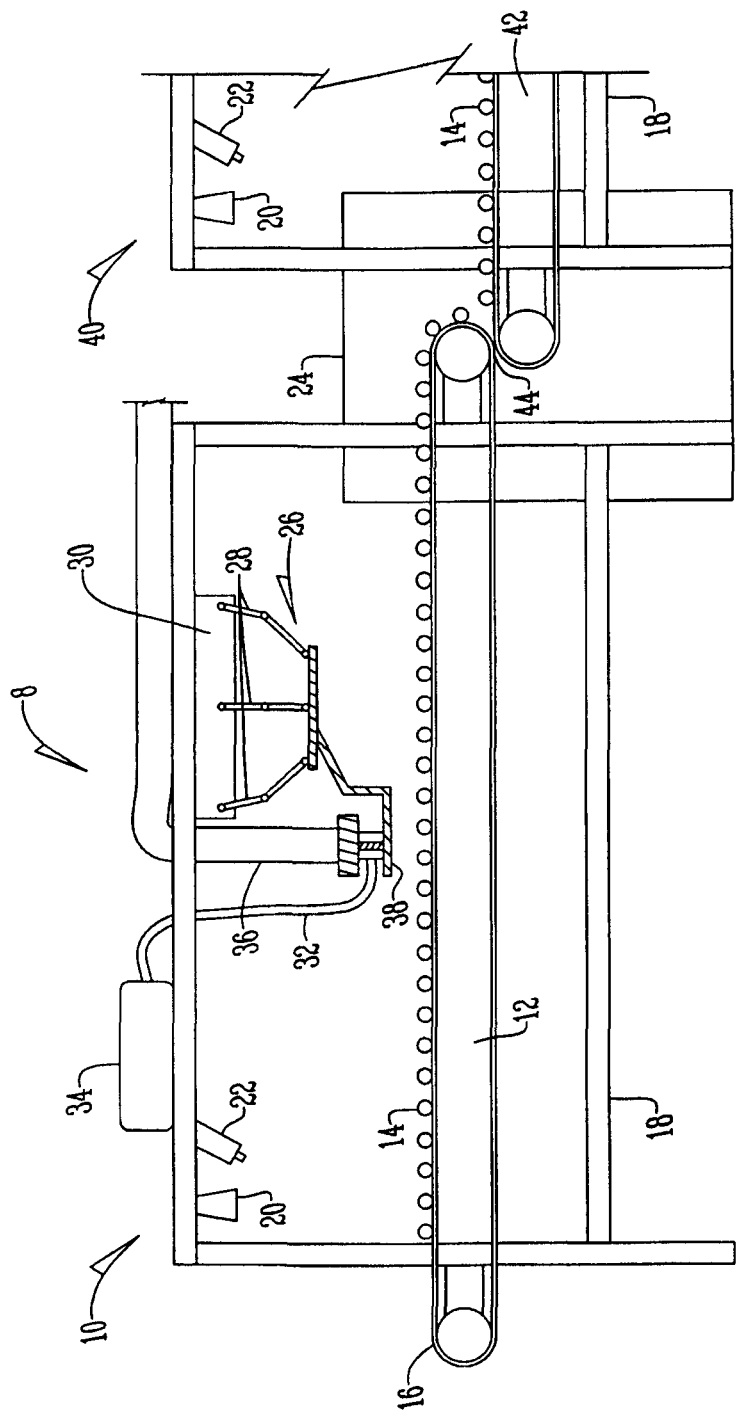
FIG. 1 is a partial side view of a sorting system.
Figure 2:
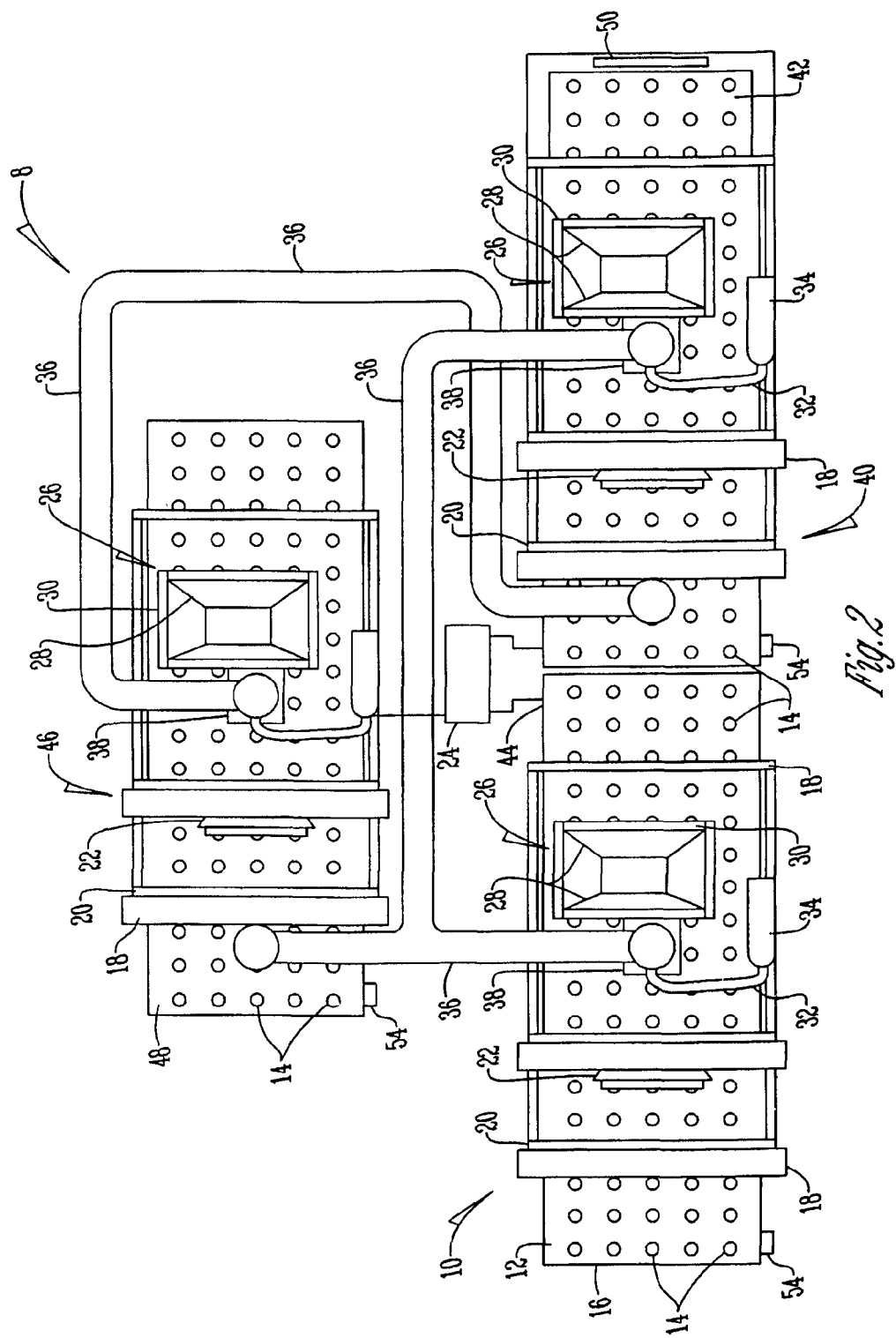
FIG. 2 is a top plan view of a sorting system.

Referring to the Figures, the sorting system 8 has a first sorting assembly 10 having a first conveyor 12 that receives product 14 ready to be sorted. As an example only, the product used in this application is almonds. But any non-agricultural or agricultural product such as walnuts, pistachios, vegetables, peppers, tomatoes, onions, olives, fruits, and the like without departing from the scope of the invention.

Positioned near the loading end 16 of the first conveyor 12 and mounted to a frame 18 is a light source 20 which is of any type and preferably includes one or more LEDs. Positioned downstream from the light source 20 and mounted to the frame 18 is an image device 22 for capturing a lighted image device 22 for capturing a lighted image of the product 14 on the first conveyor 12. The image device 22 is connected to a controller 24, such as a CPU, and transmits an image of the product 14 to the controller 24. The image device is of any type but preferably has a spectrum of 250 such as a Resonon Hyperspectral camera or the like.

Downstream from the image device 22 is a sorting device 26. While the sorting device 26 is of any type and structure, preferred is a device having one or more robotic arms 28 moveably mounted to a frame 30, a compressed air tube 32 or vacuum line/vacuum hose connected to a source of compressed air 34, a suction tube 36, and a moveable gate 38 positioned at the opening of the suction tube 36. The robotic arms 28, controlled by actuators (not shown) the source of compressed air 34, and the gate 38 are all connected to and controlled by the controller 24.

Positioned downstream from the sorting assembly 10 is a second sorting assembly 40 having a second conveyor 42, a light source 20, image device 22, and a sorting device 26. Preferably, the second conveyor 42, which is positioned adjacent a discharge end 44 of the first conveyor 12, lies in a horizontal plane below the horizontal plane of the first conveyor 12. This permits product 14 from the first conveyor 12 to flip to an opposite or second side when sorted on the second conveyor 42.

In one embodiment a third sorting assembly 46 is associated with a third conveyor 48 that receives product sorted and removed from the first and second sorting assemblies 10, 40. The third sorting assembly 46, like the first and second sorting assemblies 10, 40, has a light source 20, an image device 22, and a sorting device 26. A fourth image device 50 is associated with the discard end of any of the conveyors 12, 42, or 48 or with a fourth conveyor (not shown). The purpose of the fourth image device is to record and verify that defective product 14 has been removed prior to packaging.

All of the conveyors 12, 42 and 48 have an encoder 54 associated with each conveyor 12, 42, 48 and 52 that is also connected to the controller 24. The encoder 54 sends information to the controller 24 with respect to the rotational speed of the respective conveyor and the distance product 14 travels over time on the conveyor.

In operation, product 14 is delivered to the loading end 16 of the first conveyor 12. As product 14 passes under the light source 20, the product 14 is illuminated and the image device 22 captures information related to the product 14 that is transmitted to the controller 24. The controller 24, via software, processes the transmitted information and detects damaged product to be sorted based upon irregularities in size, shape, and/or color and the like. The controller 24 also identifies the position of the damaged product based upon the time the information was captured and its location on the width (y-axis) of the conveyor 12 and information transmitted from the encoder 54 on the speed of the conveyor (x-axis).

As the damaged product approaches the sorting device 26, the controller 24 determines the most efficient order, requiring the least amount of time and movement, to pick up the damaged product. When the damaged product reaches the sorting device 26, the controller 24 sends a signal that causes compressed air to be released from the source of compressed air 34 through the compressed air tube 32 and into the suction tube 36. The release of the compressed air through tubes 32 and 36 creates a venturi within the suction tube 36. Alternatively, the suction tube 36 is connected to a vacuum.

Once the venturi is created, the controller 24 sends a signal actuating the robotic arms 28 to move over and down to the damaged product such that the product is held against an opening 56 in gate 38 by the venturi created in the suction tube 36. Once held, the controller 24 opens the gate 38 and the damaged product is transported through tube 36 to a hopper or to the third conveyor 48. If a damaged product is missed, this information is recorded for subsequent use on the second conveyor 42.

When the sorted product reaches the discharge end 44 of the first conveyor 12, it is collected for packaging, or it falls to the second conveyor 42 such that the product 14 is flipped to a second side. The process is repeated on the second conveyor 42 wherein the product 14 is illuminated by the light source 20, an image is taken and transmitted to the controller 24 by the image device 22 and product is sorted by the sorting device 26 based upon the transmitted information from the image device 26 and the encoder 54. After sorting, product is transported to the discharge end of the second conveyor 42 for packaging.

The third conveyor 48 receives damaged product from the first sorting assembly 10 and the second sorting assembly 40. The third sorting assembly 46 operates the same as the first and second sorting assemblies 10, 40, wherein damaged product is removed and transported to a hopper via the suction tube 38 and non-damaged product is returned to either the first conveyor 12 or second conveyor 42 downstream the sorting device 26. Alternatively, the third sorting assembly 46 is programmed to detect non-damaged product such that non-damaged product is transported to the first or second conveyor 12, 42 via the suction tube 36 while damaged product is transported on the third conveyor 48 to a hopper.

A fourth image device 26 is positioned at at least one discharge end of the conveyors, preferably the conveyor where non-damaged product is presented for packaging. The purpose of positioning the image device 26 at the end of the conveyor is to verify for a customer that the product being packaged meets a desired percentage of non-damaged product.

Accordingly, a sorting assembly has been disclosed that at the very least meets all of the stated objectives.

What is claimed is:

1. A sorting system comprising:
    a first conveyor mounted to a frame;
    an image device mounted to the frame above said first conveyor;
    a controller connected to said image device wherein said controller detects damaged product based upon information transmitted by said image device; and
    a sorting device connected to said controller wherein said controller moves said sorting device over and down to remove detected damaged product; and
    wherein said controller determines an efficient order of moving said sorting device to pickup said damaged product based on a position of said damaged product detected.

2. The system of claim 1 wherein the sorting device has at least one robotic arm.

3. The system of claim 1 wherein the controller determines a most efficient order requiring a least amount of time and movement in moving the sorting device to pick up the damaged product.

4. A sorting system, comprising:
    a first sorting assembly comprising a first conveyor for transporting products;
    a second sorting assembly comprising a second conveyor for transporting products;
    wherein said second sorting assembly is positioned downstream from said first conveyor;
    a third sorting assembly comprising a third conveyor that receives products that have been detected and are determined to be damaged from said first and second sorting assemblies; and
    wherein said third sorting assembly transports non-damaged products on said third conveyor that were previously determined to be damaged to at least one of said first and second conveyors of said first and second sorting assemblies while damaged products are transported separately from said non-damaged products on said third conveyor of said third sorting assembly, the step of returning said non-damaged products from said third conveyor to at least one of said first and second conveyors occurs after receiving said products on said third conveyor from at least one of said first and second conveyors.

5. The system of claim 4 wherein the third sorting assembly removes non-damaged product from the third conveyor.

6. The system of claim 4 wherein the second conveyor lies in a horizontal plane below the horizontal plane of the first conveyor such that products from the first conveyor are flipped to a second side when sorted onto the second conveyor.

7. The system of claim 4 further comprising one or more encoders in communication with a controller, wherein the one or more encoders are configured to transmit the rotational speed of the first conveyor, the second conveyor, and the third conveyor.

8. The system of claim 4 further comprising an image device associated with a discharge end of at least one conveyor configured to record and verify that defective products have been removed from the respective conveyor.

\* \* \* \* \*